430-548 SR
11/4/86 OR H 000,156

United States Statutory Invention Registration [19]

[11] Reg. Number: H156

Ozawa et al. [43] Published: Nov. 4, 1986

[54] SILVER HALIDE COLOR LIGHT-SENSITIVE MATERIAL

[75] Inventors: Takashi Ozawa; Tsumoru Hirano, both of Kanagawa, Japan

[73] Assignee: Fuji Photo Film Co., Ltd., Minami-ashigara, Japan

[21] Appl. No.: 783,505

[22] Filed: Oct. 3, 1985

Related U.S. Application Data

[63] Continuation-in-part of Ser. No. 632,736, Jul. 20, 1984, abandoned.

[30] Foreign Application Priority Data

Jul. 20, 1983 [JP] Japan ..... 58-132135

[51] Int. Cl.[4] ..... G03C 7/32

[52] U.S. Cl. ..... 430/548; 430/555

[58] Field of Search ..... 430/548, 554, 555, 558

[56] References Cited

U.S. PATENT DOCUMENTS

| | | | |
|---|---|---|---|
| 4,409,320 | 10/1983 | Yagihara et al. | 430/381 |
| 4,411,987 | 10/1983 | Kobayashi et al. | 430/548 |
| 4,435,503 | 3/1984 | Mihayashi et al. | 430/548 |
| 4,436,808 | 3/1984 | Yagihara et al. | 430/381 |
| 4,474,870 | 10/1984 | Yagihara et al. | 430/554 |
| 4,540,654 | 9/1985 | Sato et al. | 430/548 |

*Primary Examiner*—John F. Terapane
*Assistant Examiner*—Jack Thomas
*Attorney, Agent, or Firm*—Sughrue, Mion, Zinn, Macpeak and Seas

[57] ABSTRACT

A silver halide color light-sensitive material having excellent properties for a sensitization treatment is described, containing a polymer coupler having an average molecular weight higher than 30,000 and having a polymeric unit derived from a monomeric magenta coupler represented by formula (I):

$$CH_2{=}\overset{\overset{R_1}{|}}{C}{-}A\text{-}\!\!\left(B\right)_m\!\!\text{-}\!\!\left(Y\right)_n\!\!\text{-}Q \qquad (I)$$

wherein $R_1$ is hydrogen, chlorine, or a lower alkyl group having 1 to 4 carbon atoms; A is a phenylene group, a —CONH— group, or a —COO— group; B is an unsubstituted or substituted alkylene group, an unsubstituted or substituted aralkylene group, or an unsubstituted or substituted phenylene group; Y is —O—, —NH—, —S—, —SO—, —$SO_2$—, —CONH—, —COO—, —NHCO—, or —NHCONH—; Q is a residue of a megenta color-forming coupler which forms a dye through coupling with the oxidation product of an aromatic primary amine developer; and m is 1 when n is 1, and m is 0 or 1 when n is 0.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR LIGHT-SENSITIVE MATERIAL

This is a continuation-in-part application of Ser. No. 632,736, filed July 20, 1984, now abandoned.

FIELD OF THE INVENTION

The present invention relates to a silver halide color light-sensitive material, and more particularly to a reversal color light-sensitive material which has excellent properties for a sensitization treatment.

BACKGROUND OF THE INVENTION

At present, the silver halide color light-sensitive materials typically resort to subtractive color reproduction using three primary colors. According to this process, the color image is formed by the combination of three dyes derived from a yellow color-forming coupler, a magenta color-forming coupler, and a cyan color-forming coupler.

Of the magenta color-forming couplers, nitrogen-containing heterocyclic compounds such as 5-pyrazolones are in general use. Such couplers have some disadvantages. Particularly, they are liable to restrain development. An emulsion layer containing such a coupler tends to be less sensitive and to yield a softer gradation than an emulsion layer of the same sensitivity and gradation containing a phenol-type coupler, naphthol-type coupler, and acetanilide-type coupler. Thus it is necessary to increase the sensitivity and gradation of the emulsion layer containing a magenta coupler and to control the amount of the emulsion to be applied in order to establish proper color balance. At a result, the magenta image tends to be inferior in graininess and sharpness to the other color images.

Since the coarse graininess of the magenta image stands out, a magenta image of poor graininess is fatal to the light-sensitive material. The tendency toward low sensitivity is a disadvantage in sensitization treatment which is carried out in reversal color development as noted in Example 1 in order to raise the sensitivity by extending the usual development time of the first development or the black-and-white development. In other words, the tendency toward low sensitivity destroys the color balance of yellow color-forming, magenta color-forming and cyan color-forming in the sensitization treatment. Thus, reversal color light-sensitive materials containing such above-mentioned magenta couplers have poor properties for the sensitization treatment. This is a fatal drawback for reversal color light-sensitive materials, which must often undergo a sensitization treatment.

SUMMARY OF THE INVENTION

One object of this invention is to provide a color light-sensitive material having high sensitivity.

Another object of this invention is to provide a reversal color light-sensitive material which has excellent properties for a sensitization treatment.

Still another object of this invention is to provide a color light-sensitive material which is superior in graininess.

The objects of this invention are achieved with a silver halide color light-sensitive material which contains a polymer coupler having a number average molecular weight higher than 30,000 and having a polymeric unit derived from a monomeric magenta coupler represented by formula (I):

$$CH_2{=}\overset{\overset{R_1}{|}}{C}{-}A{+}B{\rightarrow}_m{+}Y{\rightarrow}_n Q \qquad (I)$$

wherein $R_1$ is hydrogen, chlorine, or a lower alkyl group having 1 to 4 carbon atoms; A is a phenylene group, a —CONH— group, or a —COO— group; B is an unsubstituted or substituted alkylene group which may be either linear or branched, an unsubstituted or substituted aralkylene group, or an unsubstituted or substituted phenylene group; Y is —O—, —NH—, —S—, —SO—, —$SO_2$—, —CONH—, —COO—, —NHCO—, or —NHCONH—; Q is a residue of a magenta color-forming coupler which forms a dye through coupling with the oxidation product of an aromatic primary amine developer; and m is 1 when n is 1, and m is 0 or 1 when n is 0.

DETAILED DESCRIPTION OF THE INVENTION

The following is a more detailed description including preferred embodiments of B and Q according to formula (I).

B is an unsubstituted or substitued alkylene group having 1 to 10 carbon atoms which may be either linear of branched, an unsubsituted or substituted aralkylene group, or an unsubstituted or substituted phenylene group. The alkylene group includes, for example, methylene, methylmethylene, dimethylmethylene, dimethylene, trimethylene, tetramethylene, pentamethylene, hexamethylene, and decylmethylene. The aralkylene group includes, for example, benzilidene. The phenylene group includes, for example, p-phenylene, m-phenylene, and methylphenylene.

The substituent of the alkylene, aralkylene, or phenylene group represented by B can include an aryl group (e.g., a phenyl group), a nitro group, a hydroxyl group, a cyano group, a sulfo group, an alkoxy group (e.g., a methoxy group), an aryloxy group (e.g., a phenoxy group), an acyloxy group (e.g., an acetoxy group) an acylamino group (e.g., an acetylamino group), a sulfonamido group (e.g., a methanesulfonamido group), a sulfamoyl group (e.g., a methylsulfamoyl group), a halogen atom (e.g., a fluorine atom, a chlorine atom, and a bormine atom), a carboxyl group, a carbamoyl group (e.g., a methylcarbamoyl group), an alkoxycarbonyl group (e.g., a methoxycarbonyl group), and a sulfonyl group (e.g., a methylsulfonyl group). Where there are two or more substituents, they may be the same or different.

The residue of the magenta color-forming coupler represented by Q is preferably of pyrazolone type, pyrazolotriazole type, or imidazopyrazole type. Examples of useful residues are represented as follows.

(1)

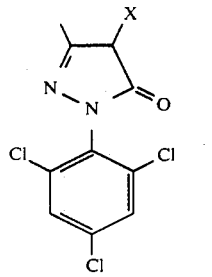

(2)

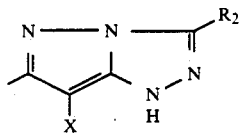

(3)

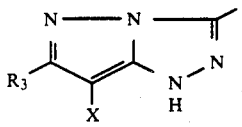

(4)

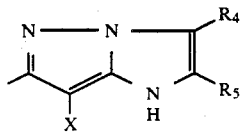

(5)

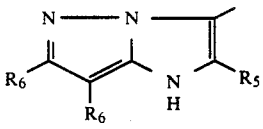

(6)

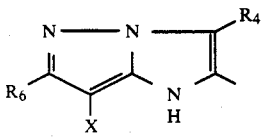

(7)

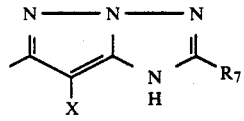

(8)

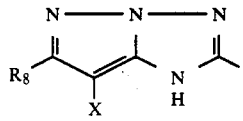

The pyrazolo[1,5-b][1,2,4]triazole residue represented by formula (7) is excellent because of less side-absorption of yellow color of the resulting dye and high light fastness.

In the foregoing residue formulae, $R_2$, $R_3$, $R_4$, $R_5$, $R_6$, $R_7$ and $R_8$ each represents a hydrogen atom, a hydroxyl group, an unsubstituted or substituted alkyl group (preferably having from 1 to 20 carbon atoms, such as a methyl group, a propyl group, a t-butyl groups, a trifluoromethyl group, and a tridecyl group), an aryl group (preferably having from 6 to 20 carbon atoms, such as a phenyl group, a 4-t-butylphenyl group, a 2,4-di-t-aminophenyl group, and a 4-methoxyphenyl group), a heterocyclic group (e.g., a 2-furyl group, a 2-thienyl group, a 2-pyrimidinyl group, and a 2-benzothiazolyl group), an alkylamino group (preferably having from 1 to 20 carbon atoms, such as a methylamino group, a diethylamino group, and a t-butylamino group), an acylamino group (preferably having from 2 to 20 carbon atoms, such as an acetylamino group, a propylamido, and a benzamido group), an anilino group (e.g., a phenylamino group and a 2-chloroanilino group), an alkoxycarbonyl group (preferably having from 2 to 20 carbon atoms, such as a methoxycarbonyl group, a butoxycarbonyl group, and a 2-ethylhexyloxycarbonyl group), an alkylcarbonyl group (preferably having from 2 to 20 carbon atoms, such as an acetyl group, a butylcarbonyl group, and a cyclohexylcarbonyl group), an arylcarbonyl group (preferably having from 7 to 20 carbon atoms, such as a benzoyl group and a 4-t-butylbenzoyl group), an alkylthio group (preferably having from 1 to 20 carbon atoms, such as a methylthio group, an octylthio group, and a 2-phenoxyethylthio group), an arylthio group (preferably having from 6 to 20 carbon atoms, such as a phenylthio group and a 2-butoxy-5-t-octylphenylthio group), a carbamoyl group (preferably having from 1 to 20 carbon atoms, such as an N-ethylcarbamoyl group, an N,N-dibutylcarbamoyl group, and an N-methyl-N-butylcarbamoyl group), a sulfamoyl group (preferably having up to 20 carbon atoms, such as an N-ethylsulfamoyl group, an N,N-diethylsulfamoyl group, and an N,N-dipropylsulfamoyl group), and a sulfonamido group (preferably having from 1 to 20 carbon atoms, such as a methanesulfonamido group, a benzenesulfonamido group, and a p-toluenesulfonamido group).

X denotes a hydrogen atom or an elimination group bonded to the coupling position through an oxygen atom, a nitrogen atom, or a sulfur atom. When X is bonded to the coupling position through an oxygen atom, a nitrogen atom, or a sulfur atom, such an atom is bonded to an alkyl group, an aryl group, an alkylsulfonyl group, an arylsulfonyl group, an alkylcarbonyl group, an arylcarbonyl group, or a heterocyclic group.-(Said alkyl group, aryl group, and heterocyclic group may have a substituent. Examples of the substituent include, for example, an alkyl group (e.g., a methyl group and an ethyl group), an alkoxy group (e.g., a methoxy group and an ethoxy group), an aryloxy group (e.g., a phenyloxy group), an alkoxycarbonyl group (e.g., a methoxycarbonyl group), an acylamino group (e.g., an acetylamino group), a carbamoyl group, an alkylcarbamoyl group (e.g., a methylcarbamoyl group and an ethylcarbamoyl group), a dialkylcarbamoyl group (e.g., a dimethylcarbamoyl group), an arylcarbamoyl group (e.g., a phenylcarbamoyl group), an alkylsulfonyl group (e.g., a methylsulfonyl group), an arylsulfonyl group (e.g., a phenylsulfonyl group), an alkylsulfonamido group (e.g., a methanesulfonamido group), an arylsulfonamido group (e.g., a phenylsulfonamido group), a sulfamoyl group, an alkylsulfamoyl group (e.g., an ethylsulfamoyl group), a dialkylsulfamoyl group (e.g., a dimethylsulfamoyl group), an alkylthio group (e.g., a methylthio group), an arylthio group (e.g., a phenylthio group), a cyano group, a nitro group, and a halogen atom (e.g., a fluorine atom, a chlorine atom, and a bromine atom). Where there are two or more substituents, they may be the same or different. Preferred substituents are a halogen atom, an alkyl group, an alkoxy group, an alkoxycarbonyl group, and a cyano group.) The group bonded to a nitrogen atom includes any group that contains the nitrogen atom and forms a five- or six-membered ring and that can be an elimination group (e.g., an imidazolyl group, a pyrazolyl group, a triazolyl group, and a tetrazolyl group).

Examples of the monomeric magenta coupler (from which the polymeric unit is derived for forming the polymer coupler) represented by formula (I) are set forth below.

(C-1)

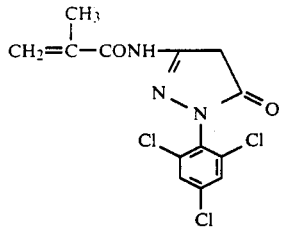

(C-2)

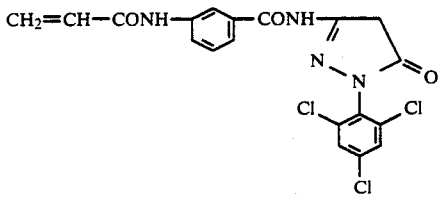

(C-3)

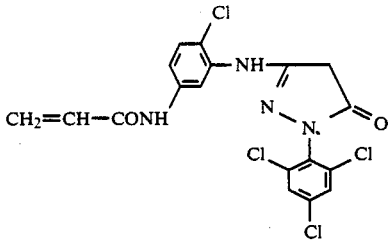

(C-4)

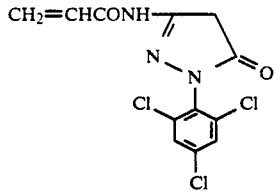

(C-5)

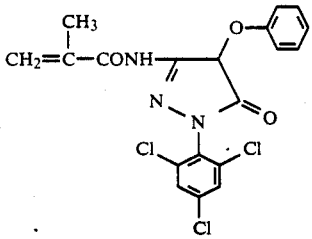

(C-6)

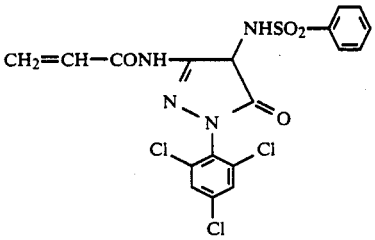

-continued (C-7)

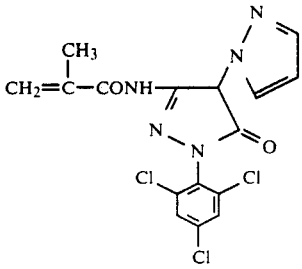

(C-8)

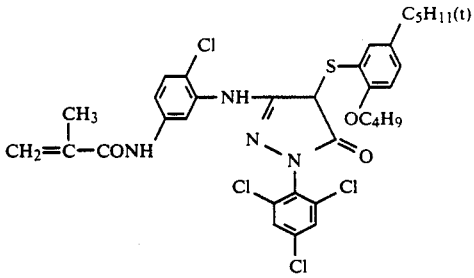

(C-9)

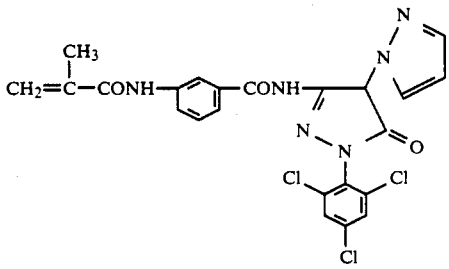

(C-10)

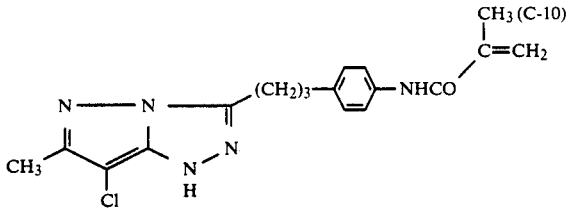

(C-11)

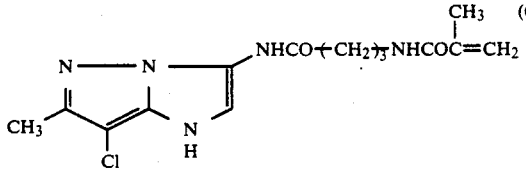

(C-12)

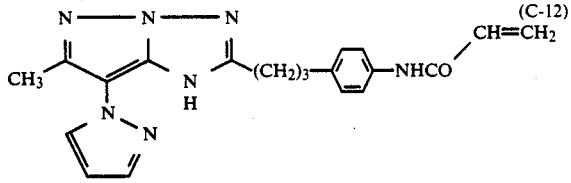

(C-13)

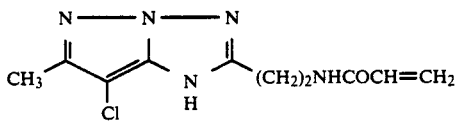

With respect to the 1-phenyl-2-pyrazolin-5-one type magenta coupler, those in which the 1-phenyl group thereof has chlorine atoms at the 2-, 4- and 6-positions thereof give a most excellent graininess, and therefore, they are more preferable than those in which the 1-phenyl group thereof has chlorine atoms at the 2- and 5-positions thereof.

The polymer coupler preferably has a number average molecular weight higher than 45,000 and more preferably higher than 80,000, but lower than 1,000,000 and more preferably lower than 500,000.

The polymer coupler is used in an amount of from $2\times10^{-3}$ mol to $5\times10^{-1}$ mol, and preferably more than $1\times10^{-2}$ mol, as a color-forming unit, per mol of silver.

The polymer coupler of the present invention may be a homopolymer of the monomeric coupler represented by formula (I) or a copolymer between monomer coupler (I) and an ethylenically unsaturated monomeric coupler which does not couple with an oxidation product of an aromatic primary amine developer (and therefore forms no color). In any of these polymers, two or more monomeric coupler included within formula (I) may be used as monomeric coupler (I).

Examples of the ethylenically unsaturated monomer which is incapable of coupling with the oxidation product of an aromatic primary amine developer include esters or amides drived from acrylic acid, α-chloroacrylic acid, α-alkyl acrylic acids (e.g. methacrylic acid, etc.) and the like (e.g., ethyl acrylate, n-propyl acrylate, n-butyl acrylate, t-butyl acrylate, iso-butyl acrylate, 2-ethylhexyl acrylate, cyclohexyl acrylate, methyl methacrylate, ethyl methacrylate, n-butyl methacrylate, n-butylacrylamide, t-butylacrylamide, diacetoneacrylamide and n-butylmethacrylamide), vinyl esters (e.g., vinyl acetate and vinyl propionate), styrene and the like. In particular, acrylates and metahcrylates are preferably used.

The non-color forming ethyleneically unsaturated monomer used here may be used together with two kinds or more. For example, the combinations of ethyl acrylate and n-butyl acrylate, n-butyl acrylate and styrene, and methyl methacrylate and diacetoneacrylamide may be used.

The ethylenically unsaturated monomer which is used to copolymerize with the monomeric coupler represented by the above-described general formula (I) can be selected so that the copolymer to be formed possesses good physical properties and/or chemical properties, for example, solubility, compatibility with a binder such as gelatin in a photographic colloid composition, flexibility, heat stability, etc., as well known in the field of polymer color couplers.

The polymer coupler used in this invention is oleophilic and, in particular, preferably used in a latex form.

For the process of emulsion dispersion of an oleophilic polymer coupler in a latex form in a gelatin aqueous solution, the process described in U.S. Pat. No. 3,451,820 can be employed.

General polymerization processes of an oleopholic polymer coupler are described below.

The free redical polymerization of the ethylenically unsaturated monomer is initiated with the addition to the monomer molecule of a free radical which is formed by thermal decomposition of a chemical polymerization initiator or a physical action, e.g., irradiation of ultraviolet rays or other high energy radiations, high frequencies, etc.

Examples of the main chemical polymerization initiators include azobis type polymerization initiators (e.g., dimethyl 2,2'-azobisisobutyrate, diethyl 2,2'-azobisisobutyrate, 2,2'-azobisisobutyronitrile, 2,2'-azobis-(2,4-dimethylvalenonitrile), etc.), benzoyl peroxide, chlorobenzoyl peroxide and other compounds.

Organic solvents which can be used in polymerization of the oleophilic polymer couplers are preferably those which can usually be admixed with monomers to be used without limitation, are good solvent for the oleophilic polymer coupler formed, do not react with initiators to be used and do not interrupt usual actions in free radical addition polymerization.

Specific useful examples of the organic solvent include aromatic hydrocarbons (e.g., benzene, toluene, etc.), hydrocarbons (e.g., n-hexane, etc.), alchohols (e.g., methanol, ethanol, n-propanol, isopropanol, tert-butanol, etc.), ketones (e.g., acetone, methyl ethyl ketone, etc.), cyclic ethers (e.g., tetrahydrofuran, dioxane, etc.), esters (e.g., ethyl acetate, etc.), chlorinated hydrocarbons (e.g., methylene chloride, chloroform, etc.), amides (e.g., dimethylformamide, dimethylacetamide, etc.), sulfoxides (e.g., dimethyl sulfoxide, etc.), nitriles (e.g., acetonitrile, etc.) and combinations thereof.

When the oleophilic polymer coupler is dispersed in a latex form in a gelatin aqueous solution, the organic solvent used for dissolving the oleophilic polymer coupler is removed from the mixture before coating the dispersed solution or at vaporization during drying of the coated dispersed solution, although the latter is rather unpreferable.

With respect to removing the solvent, a method in which the solvent is removed by washing a gelatin noodle with water is applied when the solvent is water-soluble to some extent, or a spray drying method, a vacuum purging method or a steam purging method can be employed for removing the solvent.

Examples of removable organic solvents include esters (such as lower alkyl esters), lower alkyl ethers, ketones, halogenated hydrocarbons (e.g., methylene chloride, trichloroethylene or hydrocarbon fluoride), alcohols (e.g., alcohols between n-butyl alcohol and octyl alcohol), and combinations thereof.

As the dispersing agent to disperse the oleophilic polymer coupler, any type agents may be used, but an ionic surfactant, in particular, anionic type surfactant, is suitable. The amphoteric type surfactant such as N-alkylaminopropionic acid salts and N-alkyliminodipropionic acid salts may be also used.

In order to control the color hue of dyes formed from the oleophilic polymer coupler and the oxidation product of an aromatic primary amine developer and to improve the bending property of the coated emulsion, a permanent solvent, i.e., a water non-miscible organic solvent having a high boiling point (200° C. or more), may be added.

Also, in order to make the final emulsion layer as thin as possible and to maintain a high sharpness, the concentration of the permanent solvent is preferably low.

It is desirable that the ratio of the color forming portion corresponding to the general formula (I) in the oleophilic polymer coupler is usually from 5 to 80% by weight. Particularly, a ratio from 20 to 70% by weight is preferred in view of color reproducibility, color forming property and stability. In this case, an equivalent molecular weight, that is, a gram number of the polymer containing 1 mol of the monomeric coupler, is preferably from about 250 to 4,000, but it is not limited thereto.

In this invention, the average molecular weight was measured by the gel permeation chromatography (GPC) under the following conditions.

Column: TSK gel (a trade mark for cross-linked polystyrene, made by Toyo Soda Manufacturing Co., Ltd.);

G2000H8: 1 unit; (Molecular weight of exclusion limit: 10,000); (Column dimensions: 7.51 mm(D)×600 mm(L))

G4000H8: 1 unit; (Molecular weight of exclusion unit: 400,000); (Column dimensions: 7.51 mm(D)×600 mm(L))

Solvent: THF (tetrahydrofuran)
Flow rate: 1 ml/min
Column temperature: 40° C.
Detect: UV-8 Model II (made by Toyo Soda Manufacturing Co., Ltd.)
A calibration curve was prepared by using TSK standard polystyrene.

Preparation Example (1) for polymer coupler (I)

Copolymer coupler composed of 1-(2,4,6-trichlorophenyl)-3-methacrylamido-2-pyrazolin-5-one (C-1) and butyl acrylate:

A mixture of 50 g of monomeric coupler (C-1), 50 g of butyl acrylate, and 300 g of dimethylacetamide was heated at 60° C. with stirring in a nitrogen stream. Then 10 ml of dimethylacetamide containing 0.5 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 96.2 g of polymer coupler (I).

It was indicated by chlorine analysis that this copolymer contains 52.0% of monomeric coupler (C-1). GPC gave a number average molecular weight of 105,000.

Preparation Example (2) for polymer coupler (II)

Copolymer coupler composed of 1-(2,4,6-trichlorophenyl)-3-methacrylamido-2-pyrazolin-5-one (C-1) and butyl acrylate:

A mixture of 50 g of monomeric coupler (C-1), 50 g of butyl acrylate, and 300 g of dimethylacetamide was heated at 70° C. with stirring in a nitrogen stream. Then 10 ml of dimethylacetamide containing 0.5 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 97.1 g of polymer coupler (II).

It was indicated by chlorine analysis that this copolymer contains 51.6% of monomeric coupler (C-1). GPC gave a number average molecular weight of 48,000.

Preparation Examples (3) to (10)

Polymer couplers (III) to (X) were prepared in an analogous manner to that used in Preparation Example (1); the characteristics thereof are indicated in Table 1 below:

TABLE 1

| Preparation Example | Polymer coupler | Monomeric coupler Type | Monomeric coupler Amount | Non-color forming monomer Type | Non-color forming monomer Amount | Monomeric coupler unit in polymer (wt %) | Number average molecular weight |
|---|---|---|---|---|---|---|---|
| 3 | III | C-1 | 30 g | EA | 30 g | 51.2 | 96,000 |
| 4 | IV | C-1 | 30 g | 2-EHA | 30 g | 52.5 | 108,000 |
| 5 | V | C-2 | 30 g | BA | 40 g | 44.7 | 98,000 |
| 6 | VI | C-4 | 30 g | BA | 30 g | 51.8 | 107,000 |
| 7 | VII | C-7 | 30 g | EA | 40 g | 43.9 | 96,000 |
| 8 | VIII | C-7 | 30 g | BA | 30 g | 51.6 | 98,000 |
| 9 | IX | C-9 | 30 g | BA | 30 g | 48.7 | 96,000 |
| | | | | MAA | 5 g | | |
| 10 | X | C-10 | 30 g | BA | 30 g | 50.9 | 92,000 |

EA: Ethyl acrylate
BA: Butyl acrylate
2-EHA: 2-Ethylhexyl acrylate
MAA: Methacrylic acid Comparative Example (1)

Copolymer coupler composed of 1-(2,4,6-trichlorophenyl)-3-methacrylamido-2-pyrazolin-5-one (C-1) and butyl acrylate. (Polymer coupler (A) as a comparative example):

A mixture of 50 g of monomeric coupler (C-1), 50 g of butyl acrylate, and 500 g of dimethylacetamide was heated at 80° C. with stirring in a nitrogen stream. Then 10 ml of dimethylacetamide containing 1.0 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 97.5 g of polymer coupler (A) as a comparative example.

It was indicated by chlorine analysis that this copolymer contains 50.8% of monomeric coupler (C-1). GPC gave a number average molecular weight of 15,000.

The effect of this invention is to overcome the disadvantage of the conventional magenta coupler by using certain magenta couplers having high molecular weight. In the case of a conventional magenta coupler, the nucleus is a nitrogen-containing heterocyclic ring, and this heterocyclic ring tends to be adsorbed to the surface of silver halide. This adsorption delays the development of silver halide, and hence lowers the sensitivity. The polymer coupler according to the present invention having a high molecular weight is inhibited to be adsorbed to silver halide, and thus the silver halide exhibits its inherent sensitivity. The polymer coupler should have a number average molecular weight higher than 30,000. A conventional polymer coupler having a number average molecular weight of about 10,000 still has a tendency to lower the sensitivity of emulsion.

The photographic light-sensitive material produced according to this invention may contain a conventional magenta coupler of low molecular weight in addition to the magenta polymer coupler. Such magenta couplers include 5-pyrazolone coupler, pyrazolobenzimidazole coupler, cyanoacetylcoumarone coupler, and open chain acylacetonitrile coupler.

The photographic light-sensitive material produced according to this invention may contain a yellow coupler and a cyan coupler in addition to the magenta coupler. The yellow coupler includes acylacetamide coupler (e.g., benzoylacetanilide and pivaloylacetanilide). The cyan coupler includes naphthol coupler and phenol coupler. These couplers should preferably be of a nondiffusible type which has a hydrophobic group, also preferred to as a ballast group, in the molecule The coupler may be 4-equivalent or 2-equivalent with respect to the silver ion. In addition, the coupler may be one which has a color correction effect or one which releases the development inhibitor as development proceeds (i.e., a so-called DIR coupler).

Furthermore, the photographic light-sensitive material of this invention may contain, in addition to a DIR coupler, a non-color developing DIR coupling compound which forms a colorless coupling reaction product and releases a development inhibitor.

The photographic emulsion used in this invention may be produced by the processes described in *Chimie et Physique Photographique,* by P. Glafkides (published by Paul Montel, 1967), *Photographic Emulsion Chemistry,* by G. F. Duffin (published by The Focal Press, 1966), and *Making and Coating Photographic Emulsions,* by V. L. Zelikman et al. (published by The Focal Press, 1964). In other words, it may be produced by acidic process, neutral process, or ammoniacal process. The reaction of soluble silver salt and soluble halogen salt may be accomplished by a single jet method, a double jet method, or a combination thereof. According to another process (so-called reverse mixing), the grains are formed in the presence of excess silver ions. It is also possible to employ a so-called controlled double jet method which is one type of the double jet method. According to this method, the pAg in the liquid phase in which silver halide is formed is kept constant. This method provides a silver halide emulsion in which the crystals have the regular shape and uniform grain size.

It is also permissible to mix two or more kinds of silver halide emulsions which have been prepared individually.

The formation or physical ripening of silver halide grains may be accomplished in the presence of a cadmium salt, a zinc salt, a lead salt, a thallium salt, an iridium salt or a complex thereof, a rhodium salt or a complex thereof, or an iron salt or a complex thereof.

The silver halide grains in the photographic emulsion may be regular crystals such as cubic and octahedral, or irregular crystals such as spherical and tabular (having a length/thickness ratio greater than 5, or even greater than 8), or crystals of complex forms. A mixture of grains of various crystal forms is also acceptable.

The silver halide grains may be composed of the internal layer and external layer which are different from each other, or may be composed of a uniform phase. They may be such that the latent image is formed mainly on the surface thereof, or may be such that the latent image is formed mainly inside the grain.

The light-sensitive material of this invention may contain a color antifoggant such as a hydroquinone derivative, an aminophenol derivative, a gallic acid derivative, and an ascorbic acid derivative.

The light-sensitive material of this invention may contain in the hydrophilic colloid layer a water-soluble dye as a filter dye, or for the prevention of irradiation and other purposes. Examples of such a dye include an oxonol dye, a hemioxonol dye, a stryryl dye, a merocyanine dye, a cyanine dye, and an azo dye. Useful among them are an oxonol dye, a hemioxonol dye, and a merocyanine dye.

The photographic emulsion of this invention may be incorporated with various compounds in order to prevent the photographic fog that might occur in the production or preservation of the light-sensitive material or in the photographic processing, or in order to stabilize the photographic performance. Examples of these compounds include known antifoggants and stabilizers, for example, azoles such as benzothiazolium salts, nitroindazoles, triazoles, benzotriazoles, and benzimidazoles (particularly nitro- or halogen-substituted ones); heterocyclic mercapto compounds such as mercaptothiazoles, mercaptobenzothiazoles, mercaptobenzimidazoles, mercaptothiadiazoles, mercaptotetrazoles (particularly 2-phenyl-5-mercaptotetrazole), and mercaptopyrimidines; those among the above-mentioned heterocyclic mercapto compounds which have a water-soluble group such as a carboxyl group and a sulfone group; thioketo compounds such as oxazolinethione; azaindenes (particularly 4-hydroxy-substituted (1,3,3a,7)tetraazaindenes); benzenethiosulfonic acids; and benzenesulfinic acid.

The photographic emulsion layer of the light-sensitive material of this invention may contain, for the purpose of sensitivity increase, contrast increase, and development acceleration, polyalkylene oxides or derivatives thereof such as ethers, esters, and amines, thioether compounds, thiomorpholines, quaternary ammonium salts, urethane derivatives, urea derivatives, imidazole derivatives, and 3-pyrazolidones.

EXAMPLE 1

Sample A of multilayered film was prepared by coating emulsion layers and auxiliary layers, in the order mentioned below, on a triacetyl cellulose support. The 1st layer: Slow-speed red sensitive emulsion layer An emulsion was prepared by dissolving 100 g of a cyan coupler (2-(heptafluorobutylamide)-5-[2'-(2'',4''-di-t-aminophenoxy)butylamide]-phenol) in 100 cc of tricresyl phosphate and 100 cc of ethyl acetate, and mixing with high speed agitation the resulting solution with 1 kg of 10% aqueous solution of gelatin. 500 g of the emulsion was mixed with 1 kg of slow-speed red sensitive silver iodobromide emulsion (containing 70 g of silver and 60 g of gelatin and 6 mol % of iodine; having a grain size distribution such that 81% of the total number of silver halide grains falls under ±40% of the average grain size). The resulting emulsion was applied to the support so that the dry layer thereof was 2 μm thick (silver quantity: 0.5 g/m$^2$).

The 2nd layer: Medium-speed red sensitive layer

An emulsion was prepared by dissolving 100 g of a cyan coupler (2-(heptafluorobutylamide)-5-[2'-(2'',4''-di-t-aminophenoxy)butylamide]-phenol) in 100 cc of tricresyl phosphate and 100 cc of ethyl acetate, and mixing with high speed agitation the resulting solution with 1 kg of 10% aqueous solution of gelatin. 1000 g of the emulsion was mixed with 1 kg of medium-speed red sensitive silver iodobromide emulsion (containing 70 g of silver and 60 g of gelatin and 6 mol % of iodine; having a grain size distribution of 76% measured as mentioned above for the 1st layer). The resulting emulsion was applied so that the dry layer thereof was 1 μm thick (silver quantity: 0.4 g/m$^2$)

The 3rd layer: High-speed red sensitive layer

An emulsion was prepared by dissolving 100 g of a cyan coupler (2-(heptafluorobutylamide)-5-[2'-(2'',4''-di-t-aminophenoxy)butylamide]-phenol) in 100 cc of tricresyl phosphate and 100 cc of ethyl acetate, and mixing with high speed agitation the resulting solution with 1 kg of 10% aqueous solution of gelatin. 1000 g of the emulsion was mixed with 1 kg of high-speed red sensitive silver iodobromide emulsion (containing 70 g of silver and 60 g of gelatin and 6 mol % of iodine; having a grain size distribution of 78% measured as mentioned above). The resulting emulsion was applied so that the dry layer thereof was 1 μm thick (silver quantity: 0.4 g/m$^2$).

The 4th layer: Interlayer

An emulsion was prepared by dissolving 2,5-di-t-octylhydroquinone in 100 cc of dibutyl phthalate and 100 cc of ethyl acetate, and mixing with high speed agitation the resulting solution with 1 kg of 10% aqueous solution of gelatin. 1 kg of the emulsion was mixed with 1 kg of 10% aqueous solution of gelatin. The resulting emulsion was applied so that the dry layer thereof was 1 μm thick.

The 5th layer: Slow-speed green sensitive emulsion layer

An emulsion was prepared in the same way as for the 1st layer, except that the cyan coupler was replaced by a magenta coupler (1-(2,4,6-trichlorophenyl)-3-[3-(2,4-di-t-amylphenoxyacetamide)benzamide]-5-pyrazolone). 500 g of the emulsion was mixed with 1 kg of slow-speed green sensitive silver iodobromide emulsion (containing 70 g of silver and 60 g of gelatin and 5.2 mol % of iodine; having a grain size distribution of 81% measured as mentioned above). The resulting emulsion was applied so that the dry layer thereof was 2.0 μm thick (silver quantity: 0.7 g/m$^2$)

The 6th layer: Medium-speed green sensitive emulsion layer

An emulsion was prepared in the same way as for the 1st layer, except that the cyan coupler was replaced by a magenta coupler (1-(2,4,6-trichlorophenyl)-3-[3-(2,4-di-t-amylphenoxyacetamide)behzamide]-5-pyrazolone). 1000 g of the emulsion was mixed with 1 kg of high-speed green sensitive silver iodobromide emulsion (containing 70 g of silver and 60 g of gelatin and 5.2 mol % of iodine; having a grain size distribution of 75% measured as mentioned above). The resulting emulsion was applied so that the dry layer thereof was 1 μm thick (silver quantity: 0.35 g/m$^2$).

The 7th layer: High-speed green sensitive emulsion layer

An emulsion was prepared in the same way as for the 1st layer, except that the cyan coupler was replaced by a magenta coupler (1-(2,4,6-trichlorophenyl)-3-[3-(2,4-di-t-amylphenoxyacetamide)benzamide]-5-pyrazolone). 1000 g of the emulsion was mixed with 1 kg of high-speed green sensitive silver iodobromide emulsion (containing 70 g of silver and 60 g of gelatin and 5.2 mol % of iodine; having a grain size distribution of 75% measured as mentioned above). The resulting emulsion was applied so that the dry layer thereof was 1 μm thick (silver quantity: 0.35 g/m$^2$).

The 8th layer: Interlayer 1 kg of the emulsion as used for the 4th layer was mixed with 1 kg of 10% aqueous solution of gelatin. The emulsion was applied so that the dry layer thereof was 1 μm thick.

The 9th layer: Yellow filter layer

An emulsion containing yellow colloidal silver was applied so that the dry layer thereof was 1 μm thick.

The 10th layer: Slow-speed blue sensitive emulsion layer

An emulsion was prepared in the same way as for the 1st layer, except that the cyan coupler was replaced by a yellow coupler (α-(pivaloyl)-α-(1-benzyl-5-ethoxy-3-hydantoinyl)-2-chloro-5-dodecyloxycarbonyl-acetanilide). 1000 g of the emulsion was mixed with 1 kg of slow-speed blue sensitive silver iodobromide emulsion (containing 70 g of silver and 60 g of gelatin and 5.5 mol % of iodine; having a grain size distribution of 77% measured as mentioned above). The resulting emulsion was applied so that the dry layer thereof was 2.0 μm thick (silver quantity: 0.6 g/m$^2$).

The 11th layer: Medium-speed blue sensitive emulsion layer

An emulsion was prepared in the same way as for the lst layer, except that the cyan coupler was replaced by a yellow coupler (α-(pivaloyl)-α-(1-benzyl-5-ethoxy-3-hydantoinyl)-2-chloro-5-dodecyloxycarbonyl-acetanilide). 1000 g of the emulsion was mixed with 1 kg of high-speed blue sensitive silver iodobromide emulsion (containing 70 g of silver and 60 g of gelatin and 5.5 mol % of iodine; having a grain size distribution of 72% measured as mentioned above). The resulting emulsion was applied so that the dry layer thereof was 1.0 μm thick (silver quantity: 0.5 g/m$^2$).

The 12th layer: High-speed blue sensitive emulsion layer

An emulsion was prepared in the same way as for the 1st layer, except that the cyan coupler was replaced by a yellow coupler (α-(pivaloyl)-α-(1-benzyl-5-ethoxy-3-hydantoinyl)-2-chloro-5-dodecyloxycarbonyl-acetanilide). 1000 g of the emulsion was mixed with 1 kg of high-speed blue sensitive silver iodobromide emulsion (containing 70 g of silver and 60 g of gelatin and 5.5 mol % of iodine; having a grain size distribution of 72% measured as mentioned above). The resulting emulsion was applied so that the dry layer was 1.0 μm thick (silver quantity: 0.5 g/m$^2$).

The 13th layer: The second protective layer 1 kg of the emulsion used for the 3rd layer was mixed with 1 kg of 10% gelatin. The resulting emulsion was applied so that the dry layer thereof was 2 μm thick.

The 14th layer: The first protective layer

A 10% gelatin aqueous solution containing an emulsion of fine grains (grain size: 0.15 μm, 1 mol % silver iodobromide) which is not chemically sensitized was applied so that the dry layer thereof was 1 μm thick (silver quantity: 0.3 g/m$^2$).

On the other hand, polymer coupler latexes (a), (b), (c), (d), and (e) were prepared from polymer coupler (A) (for comparison), and polymer couplers (II), (I), (III), and (X) of this invention, respectively, in the following way. Each polymer coupler (20 g in the case of polymer coupler (A) for comparison, and an equimolar amount to the 20 g of polymer coupler (A) in the case of polymer couplers of this invention in terms of color forming unit moiety) was dissolved with heating in 60 ml of ethyl acetate, and the resulting solution was added to 300 ml of aqueous solution containing 15 g of gelatin and 1.2 g of sodium laurylsulfate, followed by dispersion by a colloid mill. Finally, the ethyl acetate was removed under reduced pressure.

Using these latex dispersions in place of the magenta coupler emulsion in sample A, samples B, C, D, E, and F were prepared, respectively, in the same way as for sample A. Each latex was used in an equimolar amount of the magenta coupler in terms of coupler unit.

The samples A to F were exposed to light and underwent the reversal color process. In the first experiment, the first development was performed for 6 minutes for standard processing; and in the second experiment, the first development was performed for 10 minutes for sensitization processing.

| Processing (Standard processing) | | |
|---|---|---|
| Step | Time | Temperature |
| First development | 6 min | 38° C. |
| Water washing | 2 min | 38° C. |
| Reversal | 2 min | 38° C. |
| Color forming development | 6 min | 38° C. |
| Adjustment | 2 min | 38° C. |
| Bleaching | 6 min | 38° C. |
| Fixing | 4 min | 38° C. |
| Water washing | 4 min | 38° C. |
| Stabilization | 1 min | Normal temp. |
| Drying | | 45° C. |
| First development | | |
| Water | | 700 ml |
| Sodium tetrapolyphosphate | | 2 g |
| Sodium sulfite | | 20 g |
| Hydroquinone monosulfonate | | 30 g |
| Sodium carbonate (monohydrate) | | 30 g |
| 1-Phenyl-4-methyl-4-methoxy-3-pyrazolidone | | 2 g |
| Potassium bromide | | 2.5 g |
| Potassium thiocyanate | | 1.2 g |
| Potassium iodode (0.1% solution) | | 2 ml |
| Water to make | | 1000 ml |
| Reversal | | |
| Water | | 700 ml |
| Nitrilo-N,N,N—trimethylenesulfonic acid hexasodium salt | | 3 g |
| Stannous chloride (dihydrate) | | 1 g |
| p-Aminophenol | | 0.1 g |
| Sodium hydroxide | | 8 g |
| Glacial acetic acid | | 15 ml |
| Water to make | | 1000 ml |
| Color forming development | | |
| Water | | 700 ml |
| Sodium tetrapolyphosphate | | 2 g |
| Sodium sulfite | | 7 g |
| Sodium tertiary phosphate (dihydrate) | | 36 g |
| Potassium bromide | | 1 g |
| Potassium iodode (0.1% solution) | | 90 ml |
| Sodium hydroxide | | 3 g |
| Citrazinic acid | | 1.5 g |
| 4-Amino-3-methyl-N—ethyl-β-hydroxyethylaniline sesquisulfate monohydrate | | 11 g |
| Ethylenediamine | | 3 g |
| Water to make | | 1000 ml |
| Adjustment | | |
| Water | | 700 ml |
| Sodium sulfite | | 12 g |
| Sodium ethylenediaminetetraacetate (dihydrate) | | 8 g |
| Thioglycerine | | 0.4 ml |
| Glacial acetic acid | | 3 ml |
| Water to make | | 1000 ml |
| Bleaching | | |
| Water | | 800 ml |
| Sodium ethylenediaminetetraacetate (dihydrate) | | 2.0 g |
| Ferric ammonium ethylenediaminetetraacetic (dihydrate) | | 120.0 g |
| Potassium bromide | | 100.0 g |
| Water to make | | 1000 ml |
| Fixing | | |
| Water | | 800 ml |
| Ammonium thiosulfate | | 80.0 g |
| Sodium sulfite | | 5.0 g |
| Sodium bisulfite | | 5.0 g |
| Water to make | | 1000 ml |
| Stabilization | | |

-continued

| Processing (Standard processing) | |
|---|---|
| Water | 800 ml |
| Formalin (37 wt %) | 5.0 ml |
| Fuji Dri-Wel | 5.0 ml |
| Water to make | 1000 ml |

After development, the sensitivity of the magenta image was measured, and the difference (ΔS) between the sensitivity (*1) in sensitization processing and the sensitivity in standard processing was obtained. The results are shown in the following Table 2.

TABLE 2

| Sample | Coupler | Number average molecular weight | ΔS (in log) |
|---|---|---|---|
| A | Low molecular weight coupler | — | +0.37 |
| B | Polymer coupler (A) for comparison | 15,000 | +0.38 |
| C | Polymer coupler (II) | 48,000 | +0.47 |
| D | Polymer coupler (I) | 105,000 | +0.55 |
| E | Polymer coupler (III) | 96,000 | +0.51 |
| F | Polymer coupler (X) | 92,000 | +0.55 |

*1: Exposure that gives a density of 1.0.

It is noted from this table that a polymer coupler having a high average molecular weight provides increased sensitization when the light-sensitive material containing it undergoes sensitization processing. Thus the light-sensitive material containing such coupler is suitable for sensitization treatment.

EXAMPLE 2

Sample (1) of multilayered color light-sensitive material was prepared by forming the following layers on a polyethylene terephthalate film support.

The 1st layer: Antihalation layer

A gelatin layer containing black colloidal silver.

The 2nd layer: Interlayer

A gelatin layer containing an emulsion of 2,5-di-t-octylhydroquinone.

The 3rd layer: Slow-sensitive red sensitive emulsion layer

Silver iodobromide emulsion (silver iodide: 5 mol %): Silver quantity: 1.6 g/m$^2$ Sensitizing dye I $4.5\times10^{-4}$ mol per mol of silver Sensitizing dye II $1.5\times10^{-4}$ mol per mol of silver Coupler EX-1

0.04 mol per mol of silver

Coupler EX-3

0.003 mol per mol of silver

Coupler EX-9

0.0006 mol per mol of silver

The 4th layer: High-speed red sensitive emulsion layer

Silver iodobromide emulsion (silver iodide: 10 mol %): Silver quantity: 1.4 g/m$^2$ Sensitizing dye I $3\times10^{-4}$ mol per mol of silver Sensitizing dye II $1\times10^{-4}$ mol per mol of silver Coupler EX-1

0.002 mol per mol of silver

Coupler EX-2

0.02 mol per mol of silver

Coupler EX-3

0.0016 mol per mol of silver

The 5th layer: Interlayer

Same as the 2nd layer.

The 6th layer: Slow-speed green sensitive emulsion layer

Silver iodobromide emulsion (silver iodide: 4 mol %): Silver quantity: 1.2 g/m$^2$ Sensitizing dye III $5\times10^{-4}$ mol per mol of silver Sensitizing dye IV $2\times10^{-4}$ mol per mol of silver Coupler EX-4

0.05 mol per mol of silver

Coupler EX-5

0.008 mol per mol of silver

Coupler EX-9

0.0015 mol per mol of silver

The 7th layer: High-speed green sensitive emulsion layer

Silver iodobromide emulsion (silver iodide: 8 mol %): Silver quantity: 1.3 g/m$^2$ Sensitizing dye III $3\times10^{-4}$ mol per mol of silver Sensitizing dye IV $1.2\times10^{-4}$ mol per mol of silver Coupler EX-7

0.017 mol per mol of silver

Coupler EX-6

0.003 mol per mol of silver

Coupler EX-10

0.0003 mol per mol of silver

The 8th layer: Yellow filter layer

A gelatin layer of an emulsion containing yellow colloidal silver and 2,5-di-t-octylhydroquinone in an aqueous solution of gelatin.

The 9th layer: Slow-speed blue sensitive emulsion layer

Silver iodobromide emulsion (silver iodide: 6 mol %): Silver quantity: 0.7 g/m$^2$ Coupler EX-8

0.25 mol per mol of silver

Coupler EX-9

0.015 mol per mol of silver

The 10th layer: High-speed blue sensitive emulsion layer Silver iodobromide emulsion (silver iodide: 6 mol %): Silver quantity: 0.6 g/m$^2$ Coupler EX-8

0.06 mol per mol of silver

The 11th layer: The first protective layer

A gelatin layer of an emulsion containing silver iodobromide (silver iodide: 1 mol %, average grain size: 0.07 μm, silver quantity: 0.5 g/m$^2$) and ultravilot absorber UV-1.

The 12th layer: The second protective layer

A gelatin layer containing polymethyl methacrylate grains (about 1.5 μm in diameter).

In addition to the above-mentioned compounds, gelatin hardener H-1 and surface active agent were added to each layer.

On the other hand, polymer coupler latexes (a), (b), (c), (d), and (e) were prepared from polymer couple (A) (for comparison), and polymer couplers (II), (I), (III), and (X) of this invention, respectively, in the following way. Each polymer coupler (20 g in the case of polymer coupler (A) for comparison, and an equimolar amount to the 20 g of polymer coupler (A) in the case of polymer coupler of this invention in terms of color forming unit moiety) was dissolved with heating in 60 ml of ethyl acetate, and the resulting solution was added to 300 ml of aqueous solution containing 15 g of gelatin and 1.2 g of sodium laurylsulfate, followed by dispersion by a colloid mill. Finally, the ethyl acetate was removed under reduced pressure.

Using these latex dispersions in place of the emulsion of magenta coupler EX-4 in sample (1), samples (2), (3), (4), (5), and (6) were prepared, respectively, in an analogous manner as for sample (1). Each latex was used in an equimolar amount of the magenta coupler of sample (1) in terms of coupler unit.

The samples (1) to (6) were exposed to light and underwent the color negative process. In the first experiment, the color development was performed for 3 minutes and 15 seconds for standard processing; and in the second experiment, the color development was performed for 6 minutes and 20 seconds for sensitization processing.

The development was performed as follows at 38° C.

| | |
|---|---|
| 1. Color development | 3 min 15 sec |
| 2. Bleaching | 6 min 30 sec |
| 3. Water washing | 3 min 15 sec |
| 4. Fixing | 6 min 30 sec |
| 5. Water washing | 3 min 15 sec |
| 6. Stabilization | 3 min 15 sec |

The composition of the processing solution used for

| | |
|---|---|
| Color developer | |
| Sodium nitrilotriacetate | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N—ethyl-N—β-hydroxyethylamino)-2-methylaniline sulfate | 4.5 g |
| Water to make | 1 liter |
| Bleaching solution | |
| Ammonium bromide | 160.0 g |
| Ammonia water (28%) | 25.0 cc |
| Sodium iron ethylenediamine-tetraacetate | 130.0 g |
| Glacial acetic acid | 14.0 cc |
| Water to make | 1 liter |
| Fixer | |
| Sodium tetrapolyphosphate | 2.0 g |
| Sodium sulfite | 4.0 g |
| Ammonium thiosulfate (70%) | 175.0 cc |
| Sodium bisulfite | 4.6 g |
| Water to make | 1 liter |
| Stabilizer | |
| Formalin | 8.0 cc |
| Water to make | 1 liter |

The coupler couplers, gelatin hardener, ultraviolet absorber, and sensitizing dyes used are as follows.

Coupler EX-1

Coupler EX-2

-continued
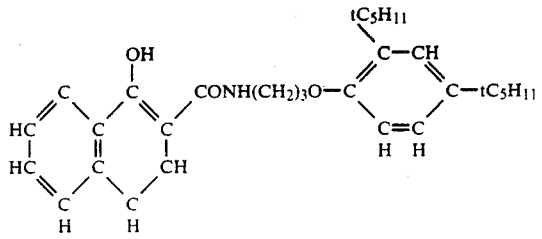
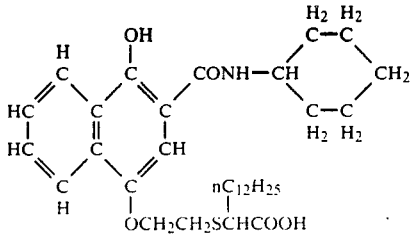
Coupler EX-3
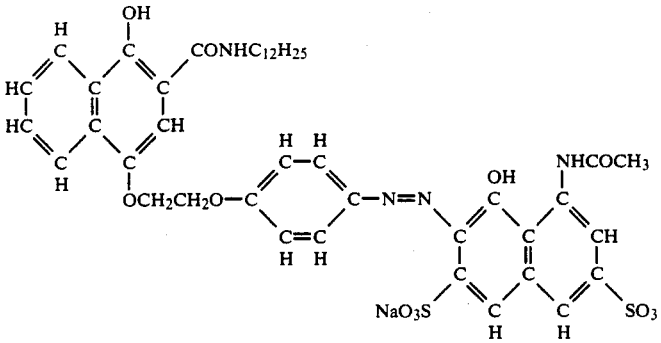
Coupler EX-4
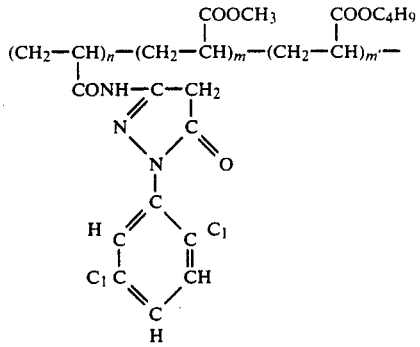
n/m + m' = 1 (by weight)
m/m' = 1 (by weight)
Average molecular weight = about 4000
Coupler EX-5
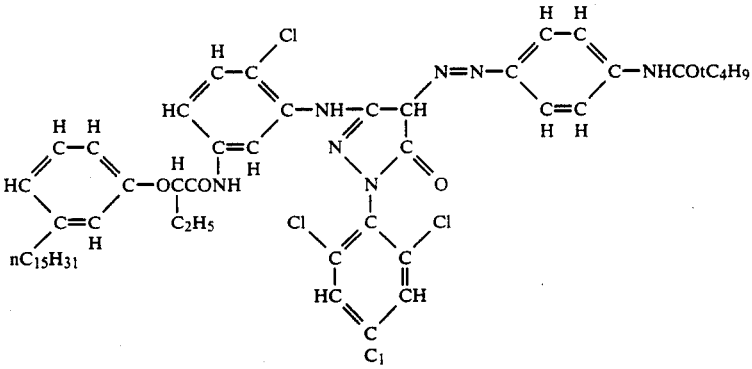
Coupler EX-6
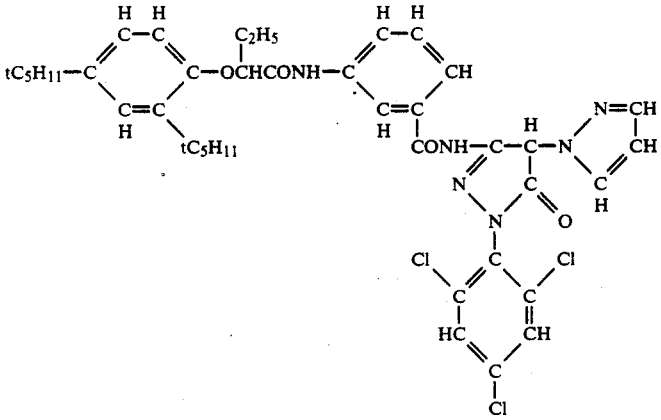
Coupler EX-7
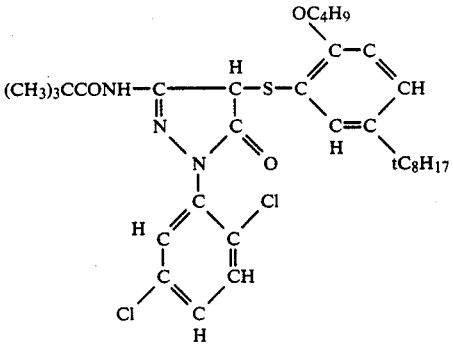
Coupler EX-8
Coupler EX-9

-continued
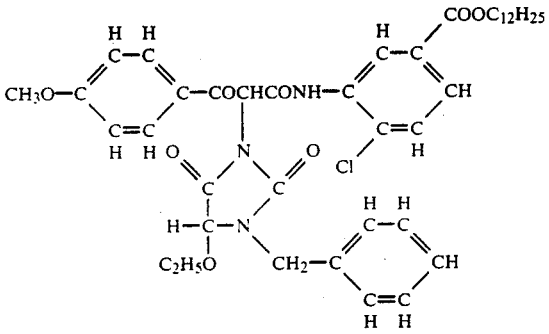
Coupler EX-10
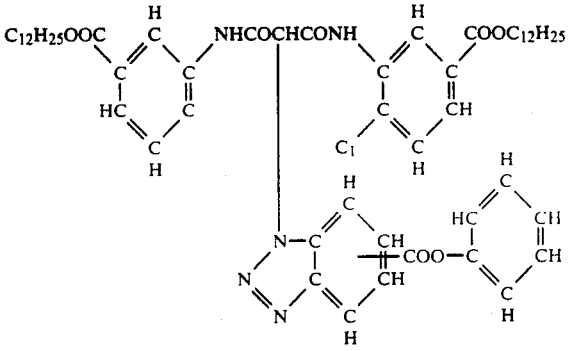
H-1
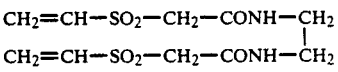
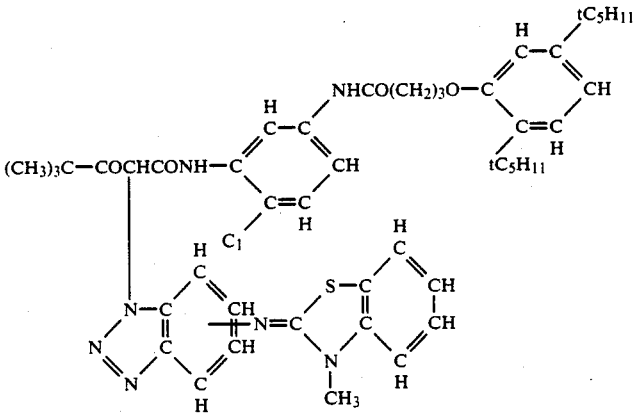
UV-1
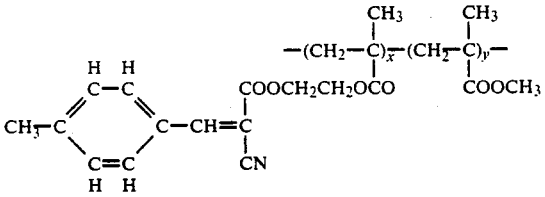
x/y = 7/3 (by weight)
Average molecular weight = about 5,000
Sensitizing dye I
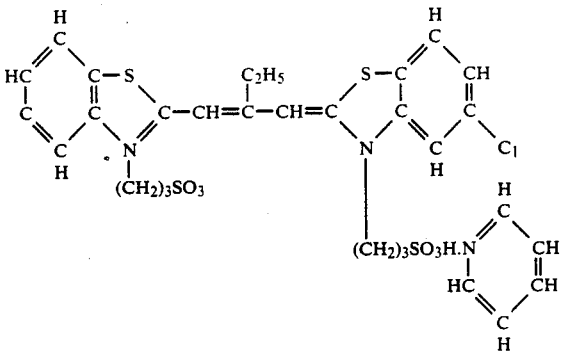
Sensitizing dye II
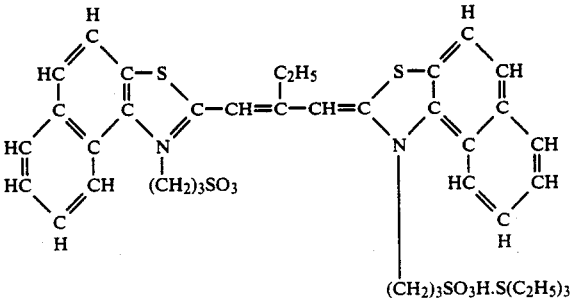
Sensitizing dye III -continued

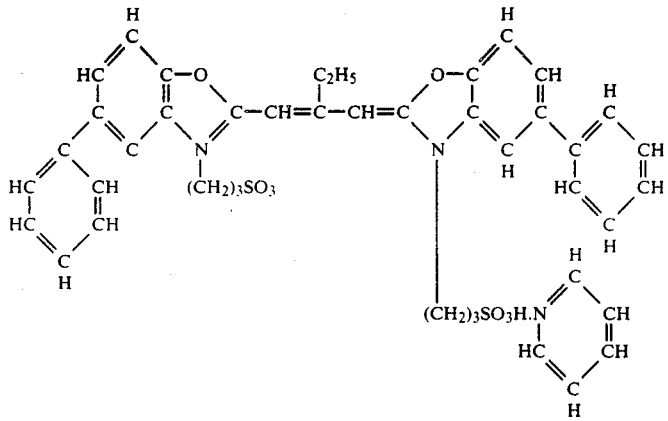

Sensitizing dye IV

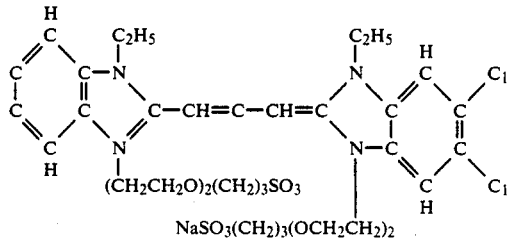

After development, the sensitivity of the magenta image was measured, and the difference (ΔS) between the sensitivity (*1) in sensitization processing and the sensitivity in standard processing was obtained. The results are shown in the following Table 3.

TABLE 3

| Sample | Coupler | Number average molecular weight | ΔS (in log) |
|---|---|---|---|
| (1) | Polymer coupler EX-4 for comparison | 4,000 | +0.08 |
| (2) | Polymer coupler (A) for comparison | 15,000 | +0.09 |
| (3) | Polymer coupler (II) | 48,000 | +0.17 |
| (4) | Polymer coupler (I) | 105,000 | +0.17 |
| (5) | Polymer coupler (III) | 96,000 | +0.13 |
| (6) | Polymer coupler (X) | 92,000 | +0.16 |

*1: Exposure that gives So. 2: Dmin + 0.2.

It is noted from the results set forth Table 3 that a polymer coupler having a high average molecular weight provides increased sensitization when the light-sensitive material containing it undergoes sensitization processing. Thus the light-sensitive material containing such coupler is suitable for sensitization treatment.

EXAMPLE 3

Preparation of Polymer Coupler (B) for Comparison

Polymer Coupler Latex (I) described in Synthesis Example 7 of U.S. Pat. No. 4,474,870, which has the following repeating unit:

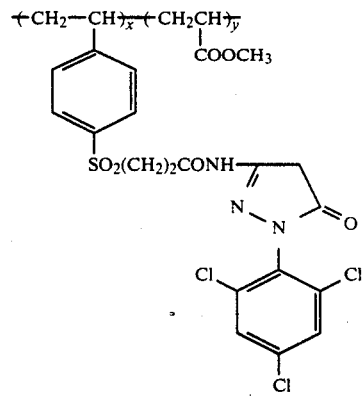

wherein x/y is 53.2/46.8 by weight, was replicated from monomeric coupler (a) represented by the following formula:

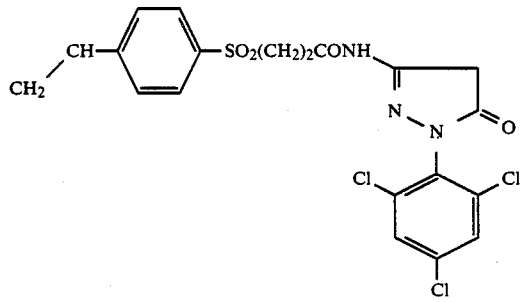

The resulting polymer is hereinafter referred to as "polymer coupler (B)". GPC gave a number average molecular weight of 12,500.

Preparation of Polymer Coupler (XI) of the Invention

A mixture of 20 g of monomeric coupler (a), 20 g of methyl acrylate, and 60 g of dimethylacetamide was heated at 60° C. in a nitrogen stream. Then 5 g of dimethylacetamide containing 0.3 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 38.1 g of polymer coupler (B).

It was indicated by chlorine analysis that this polymer contains 52.8% of monomeric coupler (a). GPC gave a number average molecular weight of 112,000.

Test samples were prepared in the same manner as in Example 1. After development, the sensitivity of the magenta image was measured, and the difference (ΔS) between the sensitivity (*1) in sensitization processing and the sensitivity in standard processing was obtained. The results are shown in the following Table 4.

TABLE 4

| Coupler | Number average molecular weight | ΔS (in log) |
|---|---|---|
| Polymer coupler (B) for comparison | 12,500 | +0.33 |
| Polymer coupler (XI) | 112,000 | +0.49 |

*1: Exposure that gives a density of 1.0.

It is noted from this table that a polymer coupler of the present invention which has a higher average molecular weight than that prepared by a known method from the same monomeric coupler provides increased sensitization when the light-sensitive material containing it undergoes sensitization processing.

EXAMPLE 4

Using monomeric coupler (C-13), polymer couplers having a pyrazolotriazole moiety were prepared.

Preparation of Polymer Coupler (XII) of the Invention

A mixture of 20 g of monomeric coupler (C-13), 20 g of butyl acrylate, and 60 g of dimethylacetamide was heated at 60° C. with stirring in a nitrogen stream. Then 50 g of dimethylacetamide containing 0.3 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 38.6 g of polymer coupler (XII).

It was indicated by chlorine analysis that this polymer contains 50.2% of monomeric coupler (C-13). GPC gave a number average molecular weight of 128,000.

Preparation of Polymer Coupler (C) for Comparison

A mixture of 20 g of monomeric coupler (C-13), 20 g of butyl acrylate, and 100 g of dimethylacetamide was heated at 85° C. with stirring in a nitrogen stream. Then 5 g of dimethylacetamide containing 0.6 g of dimethyl azobisisobutyrate was added to initiate polymerization. After reaction for 5 hours, the reaction liquid was cooled and poured into 3 liters of water. The solid which had separated out was filtered off, washed thoroughly with water, and dried with heating under reduced pressure. Thus there was obtained 38.9 g of polymer coupler (C) for comparison.

It was indicated by chlorine analysis that this copolymer contains 50.8% of monomeric coupler (C-13). GPC gave a number average molecular weight of 10,600.

Test samples were prepared in the same manner as in Example 1. After development, the sensitivity of the magenta image was measured, and the difference (ΔS) between the sensitivity (*1) in sensitization processing and the sensitivity in standard processing was obtained. The results are shown in the following Table 5.

TABLE 5

| Coupler | Number average molecular weight | ΔS (in log) |
|---|---|---|
| Polymer coupler (XII) | 128,000 | +0.30 |
| Polymer coupler (C) for comparison | 10,600 | +0.48 |

*1: Exposure that gives a density of 1.0.

It is noted from this table that a polymer coupler having a high average molecular weight provides increased sensitization when the light-sensitive material containing it undergoes sensitization processing.

While the invention has been described in detail and with reference to specific embodiment thereof, it will be apparent to one skilled in the art that various changes and modifications can be made therein without departing from the spirit and scope thereof.

What is claimed is:

1. A silver halide color light-sensitive material containing a polymer coupler having an average molecular weight higher than 30,000 and having a polymeric unit derived from a monomeric magenta coupler represented by formula (I):

$$CH_2{=}\overset{\overset{R_1}{|}}{C}{-}A\left(B\right)_m\left(Y\right)_n Q \qquad (I)$$

wherein $R_1$ is hydrogen, chlorine, or a lower alkyl group having 1 to 4 carbon atoms; A is a phenylene group, a —CONH— group or a —COO— group; B is an unsubstituted or substituted alkylene group, an unsubstituted or substituted aralkylene group, or an unsubstituted or substituted phenylene group; Y is —O—, —NH—, —S—, —SO—, —$SO_2$—, —CONH—, —COO—, —NHCO—, or —NHCONH—; Q is a residue of a magenta color-forming coupler which forms a dye through coupling with the oxidation product of an aromatic primary amine developer; and m is 1 when n is 1, and m is 0 or 1 when n is 0.

2. A silver halide color light-sensitive material as in claim 1, wherein the average molecular weight of the polymer coupler is higher than 45,000.

3. A silver halide color light-sensitive material as in claim 1, wherein the average molecular weight of the polymer coupler is higher than 80,000.

4. A silver halide color light-sensitive material as in claim 1, wherein the polymer coupler is used in an amount of from $2\times10^{-3}$ mol to $5\times10^{-1}$ mol, as a color-forming unit, per mol of silver.

5. A silver halide color light-sensitive material as in claim 2, wherein the polymer coupler is used in an amount of from $2\times10^{-3}$ mol to $5\times10^{-1}$ mol, as a color-forming unit, per mol of silver.

6. A silver halide color light-sensitive material as in claim 3, wherein the polymer coupler is used in an amount of from $2\times10^{-3}$ mol to $5\times10^{-1}$, as a color-forming unit, per mol of silver.

7. A silver halide color light-sensitive material as in claim 4, wherein the polymer coupler is used in an amount of more than $1\times10^{-2}$ mol, as a color-forming unit, per mol of silver.

8. A silver halide color light-sensitive material as in claim 5, wherein the polymer coupler is used in an amount of more than $1\times10^{-2}$ mol, as a color-forming unit, per mol of silver.

9. A silver halide color light-sensitive material as in claim 6, wherein the polymer coupler is used in an amount of more than $1\times10^{-2}$ mol, as a color-forming unit, per mol of silver.

10. A silver halide color light-sensitive material as in claim 1, wherein B is an unsubstituted or substituted alkylene group having 1 to 10 carbon atoms, an unsubstituted or substituted aralkylene group, or an unsubstituted or substituted phenylene group.

11. A silver halide color light-sensitive material as in claim 2, wherein B is an unsubstituted or substituted alkylene group having 1 to 10 carbon atoms, an unsubstituted or substituted aralkylene group, or an unsubstituted or substituted phenylene group.

12. A silver halide color light-sensitive material as in claim 3, wherein B is an unsubstituted or substituted alkylene group having 1 to 10 carbon atoms, an unsubstituted or substituted aralkylene group, or an unsubstituted or substituted phenylene group.

13. A silver halide color light-sensitive material as in claim 1, wherein the residue Q of the magenta color-forming coupler is pyrazolone pyrazolotriazole or imadiazopyrazol.

14. A silver halide color light-sensitive material as in claim 2, wherein the residue Q of the magenta color-forming forming coupler is pyrazolone pyrazolotriazole or imadiazopyrazole.

15. A silver halide color light-sensitive material as in claim 3, wherein the residue Q of the magenta color-forming coupler is pyrazolone pyrazolotriazole or imadiazopyrazole.

16. A silver halide color light-sensitive material as in claim 4, wherein the residue Q of the magenta color-forming coupler is pyrazolone pyrazolotriazole or imadiazopyrazole.

17. A silver halide color light-sensitive material as in claim 7, wherein the residue Q of the magenta color-forming coupler is pyrazolone pyrazolotriazole or imadiazopyrazole.

18. A silver halide color light-sensitive material as in claim 1, wherein the residue Q of the magenta color-forming coupler is 1-(2,4,6-trichlorophenyl)-2-pyrazolin-5-one.

19. A silver halide color light-sensitive material as in claim 1, wherein the residue Q of the magenta color-forming coupler is pyrazolo[1,5-b][1,2,4]triazole.

* * * * *